United States Patent [19]

Parcevaux et al.

[11] Patent Number: 4,721,160
[45] Date of Patent: Jan. 26, 1988

[54] COMPOSITION FOR A LIGHTWEIGHT CEMENT SLURRY FOR CEMENTING OIL AND GAS WELLS

[75] Inventors: Philippe Parcevaux; Patrick Sault, both of St. Etienne, France

[73] Assignee: Dowell Schlumberger Incorporated, Tulsa, Okla.

[21] Appl. No.: 767,002

[22] Filed: Aug. 19, 1985

[51] Int. Cl.⁴ .......................... C04B 2/35; E21B 33/14
[52] U.S. Cl. .................................. 166/293; 523/130; 524/3; 524/6; 524/8
[58] Field of Search ............... 166/293, 285, 292, 294; 523/130; 524/3, 6, 8

[56] References Cited

U.S. PATENT DOCUMENTS 4,537,918 8/1985 Parcevaux et al. ............. 166/293 X

Primary Examiner—George A. Suchfield

[57] ABSTRACT

A lightweight cement slurry composition having a density in the range of 1.2 to 1.6, containing a solid extender agent and an SBR latex. The ratio of the liquid volume to the slurry volume should be less than 70% and preferably less than 63%. The lightweight slurry then presents a most attractive set of properties which could not be obtained previously, and in particular gas channelling is controlled.

16 Claims, 1 Drawing Figure

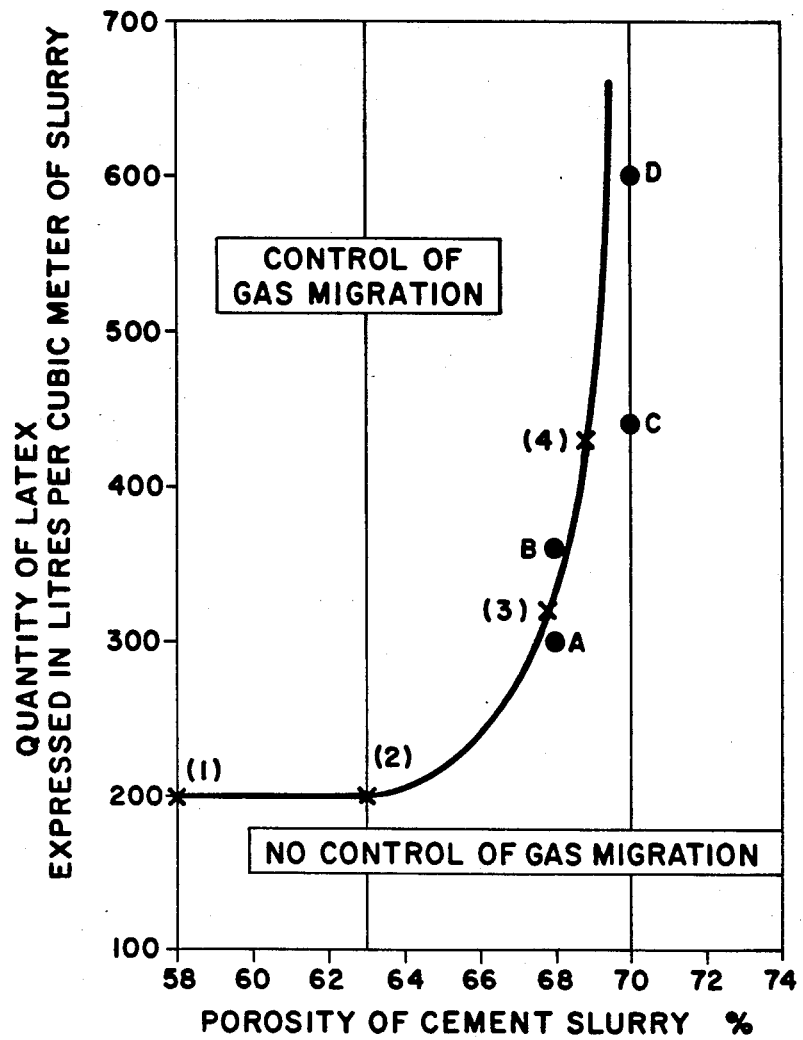

COMPOSITION FOR A LIGHTWEIGHT CEMENT SLURRY FOR CEMENTING OIL AND GAS WELLS

The present invention relates to cementing the annulus in oil and gas wells. More particularly, the invention relates to compositions of lightweight cement slurries which include a solid extender and a stryrene-butadiene latex.

It is known that cementing oil and gas wells is a very special sector of the art which requires cement slurries having a special set of properties.

Thus, in order to obtain effective cementing, it is necessary to have a slurry in which the following properties can be suitably adjusted: setting time; fluid loss; bonding properties to underground formations; rheology; stability; permeability; and gas-channelling control.

It is known that it is particularly difficult to obtain a lightweight cement having adequate properties in all the above-mentioned fields simultaneously.

Up till now, such a lightweight cement having a specific gravity lying in the range 1.2 to 1.6 has not been known.

When lightweight slurries of known types are prepared, the following problems are presented and it is not known how to solve them simultaneously:

the problem of a non-homogenous slurry and of settling, the different densities of the dry materials making up the mixture and the large quantity of water cause the denser particles to settle (i.e. the particles of cement) and separate a column of cement into various fractions from pure water to dense cement at the bottom;

thickening time: the presence of a small quantity of Portland cement and of a large quantity of water gives rise to very long thickening times, particularly since lightweight slurries are generally used in shallow wells in which the bottom temperature is not high; it may also be observed that conventional setting accelerators are generally ineffective in such dilute slurries; fluid loss: the control of fluid loss is very poor in lightweight slurries; the only agents which are effective at controlling fluid loss are cellulose derivatives having a high molecular weight which give rise to high viscosity and extremely long thickening times, and which in any case do not improve fluid loss to better than 200 ml/30 min.;

compressive/shear strengths: the mechanical properties of the cement take a very long time to develop, and their final values remain very low; and gas migration or gas channelling in the slurry: the high ratio of water volume to solid matter volume gives rise to a slurry which is highly permeable; such lightweight slurries are thus naturally subjected to a very high degree of gas channelling while the cement is setting.

In this respect a study of the prior art is most revealing. It can be seen that the object of known slurries is to solve one of the problems mentioned above without being capable of solving all of them.

Thus, (see U.S. Pat. Nos. 4,235,291 and 4,120,360) clays may be used in lightweight cements down to a density of 1.4 in order to prevent settling and to reduce permeability and the phenomenon of gas migration in the cemented annulus (i.e. the phenomenon known as "gas channelling").

Soluble silicates are used for lightweight slurries down to a density of 1.4 and have the effect of accelerating the thickening thereof.

Fly ashes and pozzolans (see U.S. Pat. Nos. 3,669,701 and 3,832,196) are used for lightweight cement slurries down to a density of 1.5, and have the effect of reducing permeability and improving compression strength.

Hollow microspheres have been used to obtain very low specific gravity in the range about 1.0 to 1.5. Such lightening agents give rise to high compression strength but are extremely difficult to stabilize in the slurry because they tend to float, thereby requiring large quantities of clay to be used to prevent the cement particles from settling. Such a method is described in U.S. Pat. No. 3,669,701.

Lightweight cement slurries have also been prepared by producing a foam, to obtain very low specific gravity of about 1.0 to 1.4. Such slurries have improved compression strength and improved resistance to gas migration. Further, this is a very special kind of lightweight slurry in that the light weight is due to foaming and not to the addition of a solid extender.

The present invention relates to an improved composition for a lightweight cement slurry in which the weight reduction is provided by means of solid particles having a specific gravity of substantially 1.2 to 1.6 and including a styrene-butadiene latex.

The originality of the invention lies not only in the nature of its ingredients, but also in their relative proportions which make it possible for the first time to obtain a lightweight slurry having a set of very good properties. Such a result has been sought for many years because of the problems encountered on site when using conventional lightweight slurries.

Compositions in accordance with the invention consist mainly of Portland cement, an extender in the form of solid particles, and a styrene-butadiene latex (together with a stabilizer therefor, if required), and water.

The mix water may be fresh water, sea water, or brine.

The above constitutes the basic formulation.

In order to prevent settling, the following may be added to said basic formulation:

small quantities of clay minerals (montmorillonite, attapulgite, sepiolite) or water soluble polymers such as polystyrene sulfonates, cellulose derivatives, and mixtures thereof;

a swelling clay, in which case the latex is stabilized by a polystryene sulfonate; a cellulose, in which case the latex is stabilized by a non-ionic surface-active agent, in particular a polyethoxyl alkylphenol;

a low molecular weight polystyrene sulfonate.

The addition of a styrene-butadiene latex serves to control fluid loss and gas channelling. An organic dispersing agent of the polynaphthalene sulfonate type then serves to disperse the cement and to prevent harmful interactions between the latex and the cement when the temperature rises above about 50° C. A latex which has given good results is a latex comprising 50% styrene and 50% butadiene. As mentioned above, the originality of the invention lies in the relative proportions of the ingredients.

It has been discovered that by adjusting the porosity of the slurry, it is possible to obtain for the first time a lightweight slurry which is homogenous.

It appears that this homogenous character of the slurry, which it was not possible to obtain previously for a lightweight slurry, lies at the origin of the set of good properties which has been observed.

It has been discovered in accordance with the invention that all the necessary properties of the slurry can be simultaneously adjusted if, and only if, the volume ratio of the liquid phase of the slurry to the slurry is less than 70%.

More particularly, a liquid to slurry ratio of less than 63% should be sought, to make the invention remarkably easy to perform.

The definition of this liquid/slurry ratio, combined with the range of densities required for the slurry determine which extenders should be chosen.

Any extenders may be used provided they satisfy the following two conditions:
they should give rise to a liquid/slurry volume ratio (porosity) of less than 70%, and preferably of less than 63%; and
they should simultaneously give rise to a slurry having a specific gravity substantially in the range 1.2 to 1.6. The person skilled in the art will be able to determine which extenders are usable and in what proportions they should be used by means of a few simple and routine tests.

The following extenders may be used in particular: pozzolans; diatomic earths; fly ashes; hollow silica-alumina microspheres; and coal derivatives such as coal dust or carbon black.

It has been observed experimentally on the basis of the above criteria that in most cases the extenders selected have a density of less than 2.2 grams per cubic centimeter (g/cm$^3$). These are preferably: fly ashes, hollow microspheres, and coal derivatives (carbon black, coal dust).

If a coal derivative is used as an extender, it is necessary to add a wetting agent in order to make the coal particles wettable by water. If it is not done, the surprisingly homogenous slurry mentioned above is not obtained. Such wetting agents are described, for example, in U.S. Pat. No. 4,391,329 in column 7 at lines 25 to 46.

A particular aspect of the invention relates to the use of a mixture of at least two extenders, for example a mixture of hollow microspheres and fly ashes, in order to adjust the density of cement slurries to a desired value while retaining the liquid over slurry ratio at less than 70%.

It has also been observed that the best results are obtained when the particle size of the extender is as close as possible to the particle size of the cement, i.e. 100% less than 100$\mu$, with an average size of about 20$\mu$.

By way of example, hollow microspheres do not meet this condition since their average size is known to be generally about 300$\mu$.

When the slurry mix water is salt water or brine, it is necessary to use, in addition to the above-mentioned organic dispersant, a second latex stabilizer, which is advantageously a sulfated polyoxyethylene alkylphenol.

It has been observed experimentally that the presence of this second latex stabilizer improves the control of gas channelling in the cemented annulus, and that this is true regardless of the nature of the mix water (fresh water, salt water or sea water). This phenomenon has not been explained.

It is mentioned above that the essential aspect of the invention lies in determining the role of the porosity and more precisely in adjusting the liquid/slurry volume ratio to a value of less than 70%, and preferably less than 63%.

It has been observed that when a latex is added under the above-mentioned conditions in order to control fluid loss and gas channelling, the quantity of latex to be used is itself dependent on the liquid/slurry ratio. This relationship constitutes another essential aspect of the invention.

However, the person skilled in the art is capable of determining the quantity of latex to be used given the indications mentioned above and the following examples, by means of a few tests of a routine nature.

The following examples illustrate the invention without limiting its scope.

The sole FIGURE of the accompanying drawing is a graph showing the relationship between the quantity of latex inserted in the composition of the lightweight slurry in accordance with the invention and the porosity of the slurry.

EXAMPLE 1

The relationship between the minimum quantity of styrene-butadiene latex (SBR) to be added to the composition of a lightweight slurry in accordance with the invention and the porosity of the said slurry is shown up by the following tests.

The slurry used for these tests had the following composition:
API class G cement (specific gravity 3.15); or
A mixture of API class G cement and pozzolans (s.g. density of the mixture=2.75);
Dispersing agent (polynaphthalene sulfonate);
Anti-foaming agent (polyglycol);
SBR latex; and
Mix water.

The porosity and the density of the slurry together with the minimum quantity of SBR latex that needed to be added for effectively controlling gas-channelling were measured. The tests were perfomred at 70° C. The compositions used and the results obtained are tabulated in Table I below.

The four points obtained (1) to (4) are representative of the curve plotted on the sole FIGURE of the accompanying drawing.

Analysis of the latex/porosity curve (sole FIGURE)

(a) The curve distinguishes mainly between two regions:
"Above" the curve, and on the curve, lightweight slurries in accordance with the invention enable gas-channelling to be controlled.
"Below" the curve gas-channelling is not controlled.

(b) The curve shows up the 70% porosity limit which is the essential point of the invention. It can be seen that if the porosity is greater than substantially 70% it is impossible to control gas-channelling, regardless of the quantity of latex added.

(c) The curve also shows up the preferred upper value for the porosity (substantially 63%) in accordance with the invention. Below this value the minimum quantity of latex that needs to be added remains constant and is thus independent of the porosity. The range of porosities below 63% is preferred since this range corresponds to the smallest possible quantity of latex, which is an expensive material.

Examples 2 and 3 below illustrate the critical character of the curve plotted on the sole accompanying FIGURE.

EXAMPLE 2

Test no. (3) of Table I was performed but using 330 liters (l) of latex/metric ton (t) of slurry (i.e. 300 l/m$^3$) instead of 365 l of latex/t of slurry.

This corresponds to point (A) in the FIGURE. The resulting composition does not enable gas-channelling to be controlled.

EXAMPLE 3

Test no. (3) of Table I was performed but using 400 l of latex/t of slurry (i.e. 360 l/m³).

This corresponds to (B) in the FIGURE. This composition completely prevents gas-channelling.

EXAMPLE 4

This example shows the critical character of the upper porosity limit at 70%.

Composition

| | |
|---|---|
| A mixture of API class G cement + pozzolans s.g. = | 2.75 |
| Dispersing agent (polynaphthalene sulfonate) | 4.4 l/t |
| SBR latex (50—50) | 530 l/t |
| | i.e. 438 l/m³ |
| Anti-foaming agent (polyglycol) | 4.4 l/t |
| Water | 85.6% by volume |
| (less the volume of the liquid additives). | |
| Density of the slurry | 1.53 |
| Porosity: | 70% |
| Test temperature: | 70° C. |

This corresponds to point (C) on the curve.

This composition did not prevent gas-channelling.

An identical test performed for the purposes of confirmation and using about 600 m/l³ of latex (point D) was also incapable of prevent gas-channelling.

Some lightweight slurries in accordance with the present invention need agents for increasing the viscosity in order to prevent any settling, as mentioned above (swelling clay, celluloses), or agents for accellerating setting, or high concentrations of salts. These additives are well known for their destabilizing effect on latex.

Examples 5, 6 and 7 below illustrate this phenomenon and how to remedy it in accordance with the invention.

EXAMPLE 5

Basic composition

| | |
|---|---|
| API class G cement s.g. | 3.15 |
| 1st extender: microspheres | 33% by weight of cement |
| 2nd extender: fly ashes | 33% by weight of cement |
| SBR latex | 370 l/t |
| Anti-foaming agent (polyglycol) | 4.4 l/t |
| Fresh mix water | 126% by volume less the volume of the liquid additives. |
| Latex density: | 1.32 |

Considerable settling was observed. However, if 1% to 1.5% by weight of cement of bentonite was added to this composition, the slurry remained homogenous. Latex destabilization by clay can be prevented by adding 0.2% to 0.5% by weight of cement of a low molecular weight (10,000 to 100,000) polystyrene sulfonate.

The final composition of the lightweight slurry in accordance with the invention (basic composition+clay+polystyrene sulfonate) is capable to control gas-channelling.

EXAMPLE 6

This example is the same as example 5 except that the clay is replaced by 0.5% by weight of cement of hydroxyethylcellulose and the polystyrene sulfonate is replaced by 4% by volume of latex of polyoxyethylene nonylphenol (with an oxyethylene chain length n=30-40).

The resulting composition remained homogenous and is capable to control gas-channelling.

EXAMPLE 7

This example is the same as example 5 except that the fresh mix water was replaced by a brine containing 18% NaCl by weight of water.

In order to prevent the latex from flocculating, it is then necessary to add about 4% by volume of latex of an ammonium sulfate salt of oxyethylene-nonylphenol.

The final composition is capable to control gas-channelling.

TABLE I

| TESTS AT 70 [C | (1) | (2) | (3) | (4) |
|---|---|---|---|---|
| SLURRY COMPOSITION | | | | |
| Cement | API class G (**) | Mixture (*) | Mixture (*) | Mixture (*) |
| Dispersing agent (l/t) | 5.3 | 4.4 | 4.4 | 20 |
| SBR latex (l/t) | 150 | 195 | 365 | 460 |
| Anti-foaming agent (l/t) | 4.4 | 4.4 | 4.4 | 4.4 |
| Water (% less liquid additives) | 44 | 60.3 | 75 | 79.1 |
| DENSITY | 1.9 | 1.68 | 1.58 | 1.55 |
| POROSITY (%) | 58 | 63.1 | 67.8 | 68.9 |
| SBR LATEX (l/m³) | 200 | 200 | 330 | 420 |

(*) Mixture of API class G cement + pozzolans s.g. (density) 2.75
(**) s.g. (density) 3.15

We claim:

1. A homogeneous lightweight cement slurry for cementing the annulus of an oil or gas well, comprising: cement, an extender in the form of solid particles, a styrene-butadiene latex, and water, having a specific gravity lying substantially in the range from 1.2 to 1.6 and having a volume ratio of the liquid phase of the slurry to the total volume of the slurry of less than about 70%.

2. The lightweight cement slurry according to claim 1, wherein the volume ratio of the liquid phase of the slurry to the slurry is adjusted to a value of less than about 63%.

3. The lightweight cement slurry according to claim 1, wherein they contain as an extender at least one extender chosen from: pozzolans, diatomic earths, fly ashes, hollow silica-alumina microspheres, and coal derivatives such as coal dust and carbon black.

4. The lightweight cement slurry according to claim 3, wherein the extender is chosen from those having a density of less than 2.2 g/cm³, and in particular fly ashes, hollow silica-alumina microspheres, and coal derivatives.

5. The lightweight cement slurry according to claim 1 wherein said slurry additional contains an agent for preventing the cement from settling, said agent being chosen from:
clay minerals
polystyrene sulfonate
cellulose derivatives; and mixtures thereof.

6. The lightweight cement slurry according to claim 1, wherein said slurry further contains at least one latex stabilizer.

7. The lightweight cement slurry according to claim 1 wherein said slurry additionally contains an agent for preventing the slurry from settling in combination with a latex stabilizer.

8. The lightweight cement slurry according to claim 7 wherein said agent preventing the slurry from settling is a combination of clay and a low molecular weight polystyrene sulfonate, and wherein said latex stabilizer is a cellulose derivative or a non-ionic surface-active agent.

9. A method of cementing the annulus of a wellbore by pumping an aqueous cement slurry through the wellbore and into the annulus said aqueous cement slurry comprising
cement, an extender in the form of solid particles, a styrene-butadiene latex, and water, having a specific gravity lying substantially in the range from 1.2 to 1.6 and having a volume ratio of the liquid phase of the slurry to the total volume of the slurry of less than about 70%.

10. The method of cementing the annulus of a wellbore according to claim 9, wherein the volume ratio of the liquid phase of the slurry to the total volume of the slurry is less than about 63%.

11. The method of cementing the annulus of a wellbore according to claim 9, wherein said extender is selected from the group consisting of pozzolans, diatomic earths, fly ashes, hollow silica-alumina microspheres, and coal derivatives such as coal dust and carbon black.

12. The method of cementing the annulus of a wellbore according to claim 11, wherein said extender has a density of less than 2.2 g/cm$^3$.

13. The method of cementing the annulus of a wellbore according to claim 9, wherein said aqueous cement slurry contains an agent for preventing the cement from settling, said agent selected from the group consisting of clay mineral, polystyrene sulfonate, cellulose derivatives, and mixtures thereof.

14. The method of cementing the annulus of a wellbore according to claim 9, wherein said aqueous cement slurry contains at least one latex stabilizer.

15. The method of cementing the annulus of a wellbore according to claim 9, wherein said aqueous cement slurry contains an agent for preventing the slurry from settling in combination with at least one latex stabilizer.

16. The method of cementing the annulus of a wellbore according to claim 15, wherein said agent preventing the slurry from settling is a combination of clay and a low molecular weight polystyrene sulfonate and wherein said latex stabilizer is a cellulose derivative or a non-ionic surface active agent.

* * * * *